United States Patent [19]

Aruga et al.

[11] 4,317,331

[45] Mar. 2, 1982

[54] HYDRAULIC CIRCUIT FOR A HYDRAULICALLY DRIVEN VEHICLE

[75] Inventors: Taketo Aruga; Koichi Morita, both of Isehara, Japan

[73] Assignee: Kabushiki Kaisha Komatsu Seisakusho, Tokyo, Japan

[21] Appl. No.: 98,050

[22] Filed: Nov. 28, 1979

[30] Foreign Application Priority Data

Nov. 28, 1978 [JP] Japan .......................... 53-162678[U]

[51] Int. Cl.³ .................... F16H 39/04; F16H 39/46
[52] U.S. Cl. ........................................ 60/436; 60/441; 60/442; 60/468; 180/271; 180/307
[58] Field of Search ................. 60/436, 441, 442, 406, 60/468; 180/271, 272, 336, 307; 192/3 N, 8 R, 3 H

[56] References Cited

U.S. PATENT DOCUMENTS

| | | | |
|---|---|---|---|
| 3,475,903 | 11/1969 | Christenson | 60/436 X |
| 3,750,406 | 8/1973 | Verlinde et al. | 60/442 |
| 4,043,125 | 8/1977 | Kubik | 60/406 |
| 4,194,365 | 3/1980 | Stoufflet et al. | 60/494 |

*Primary Examiner*—Irwin C. Cohen

*Attorney, Agent, or Firm*—Armstrong, Nikaido, Marmelstein & Kubovcik

[57] ABSTRACT

A hydraulic circuit for a hydraulically driven vehicle comprising an engine, a variable displacement pump driven by the engine, a hydraulic motor connected with the variable displacement pump and driven thereby, the hydraulic motor having an output shaft connected thereto, a first fixed displacement pump driven by the engine, an inching brake valve connected with the first fixed displacement pump, a control valve connected with the output side of the inching brake valve for controlling the forward and reverse movement of the vehicle and speed thereof, the output side of which is connected with the variable displacement pump, a parking brake coupled with the output shaft of the hydraulic motor, the parking brake being normally applied by a spring and hydraulically released, a pilot operated first brake control valve connected with the parking brake, a manually operated pump connected with the first brake control valve and the inching brake valve, a pilot operated second brake control valve connected with the first brake control valve, a pilot port thereof being connected with the output side of the control valve, and a second fixed displacement pump driven by the engine and connected with the second brake control valve.

4 Claims, 1 Drawing Figure

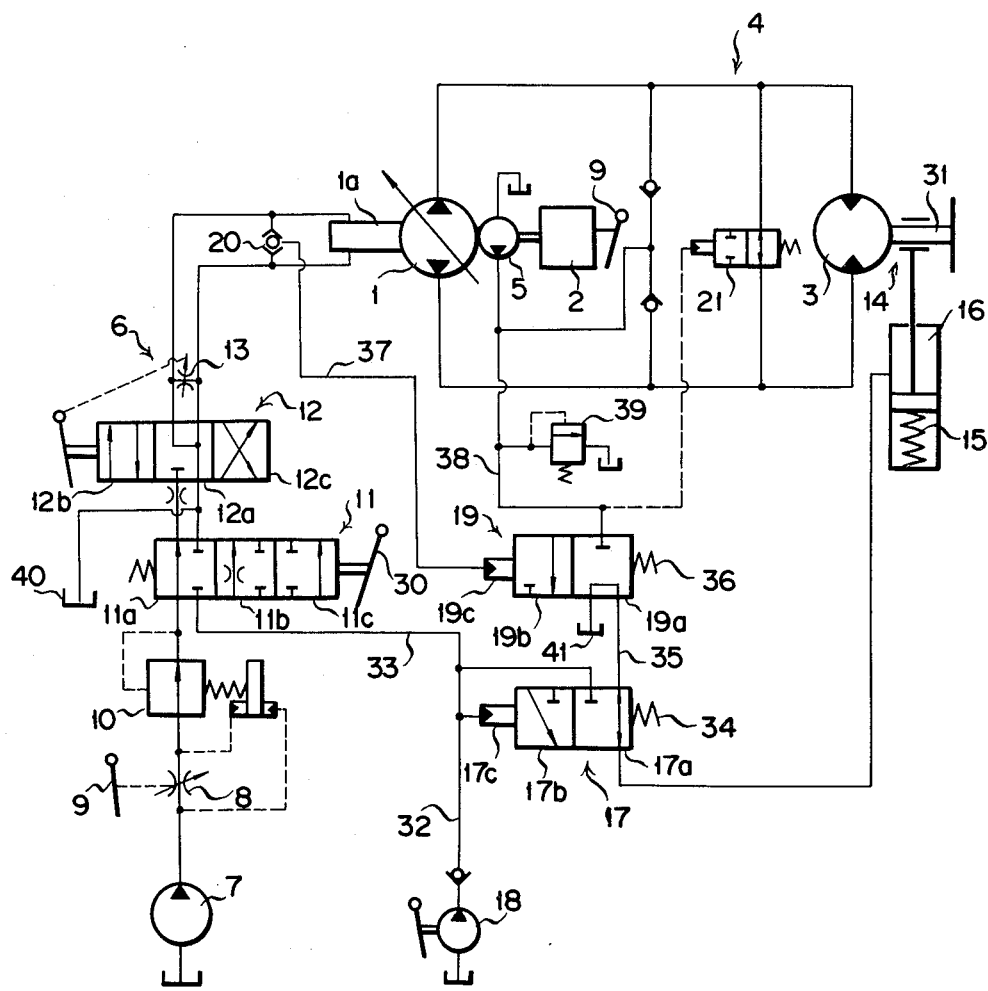

HYDRAULIC CIRCUIT FOR A HYDRAULICALLY DRIVEN VEHICLE

BACKGROUND OF THE INVENTION

This invention relates to a hydraulic circuit for a hydraulically driven vehicle and in particular to an inching brake control circuit of a hydraulically driven vehicle in which a variable displacement hydraulic pump and a hydraulic motor driven therey is connected with each other in a closed circuit.

A conventional inching brake control for a hydraulically driven vehicle involves following disadvantages.

First, a parking brake is not automatically applied when a speed change lever is returned or shifted to a neutral position. Instead, the parking brake must be applied manually after shifting the speed change lever to the neutral position. Therefore, it is very dangerous if and when an operator has forgotten to apply the parking brake manually.

Secondly, even if an inching brake control involves such a circuit that enables a parking brake to be automatically applied when a speed change lever is shifted to the neutral position, it is desirable for a vehicle to be equipped with an emergency brake circuit which enables the vehicle to be braked or retarded when the vehicle is being towed with its engine being not operated.

Conventionally, however, there has been no inching brake control for a hydraulically driven vehicle which involves the above braking circuit.

SUMMARY OF THE INVENTION

It is therefore an object of the present invention to provide a hydraulic circuit for a hydraulically driven vehicle which overcomes the above noted problems.

Another object of the present invention is to provide a hydraulic circuit for a hydraulically driven vehicle which is capable of improving the operability of the vehicle.

A further object of the present invention is to provide a hydraulic circuit for a hydraulically driven vehicle wherein a parking brake can be applied for safety purposes even when the vehicle is being towed with its engine being not operated.

In accordance with an aspect of the present invention, there is provided a hydraulic circuit for a hydraulically driven vehicle, comprising in combination:

an engine;

variable displacement pump means driven by said engine;

hydraulic motor means connected with said variable displacement pump means in a closed circuit and driven thereby, said hydraulic motor means having an output shaft connected thereto;

first fixed displacement pump means driven by said engine;

inching brake valve means connected with said first fixed displacement pump means, said inching valve means having at least a communicating position and a brake position and being normally held in the communicating position;

control valve means connected with the output side of said inching brake valve means for controlling the forward and reverse movements of the vehicle and speed thereof, said control valve means having formed therein a neutral position, a forward position and a reverse position and the output side thereof being connected with said variable displacement pump means;

parking brake means coupled with the output shaft of said hydraulic motor means, said parking brake means having spring means and hydraulic fluid chamber formed therein and being mechanically applied by said spring and released by the pressurized fluid introduced into the hydraulic fluid chamber;

pilot operated first brake control valve means connected with the hydraulic fluid chamber of said parking brake means, said first brake control valve means having a normal first position and a second position;

manually operated pump means connected with said first brake control valve means and said inching brake valve means;

pilot operated second brake control valve means connected with said first brake control valve means, pilot port thereof being connected with the output side of said control valve means, said second brake control valve means having a closed first position and a communicating second position; and second fixed displacement pump means driven by said engine and connected with said second brake control valve means whereby while the engine is running and said control valve means is either in its forward position or reverse position, said parking brake means is automatically released by introducing pressurized fluid from said second fixed displacement pump means into the hydraulic fluid chamber of said parking brake means through the communicating second position of said second brake control valve means and when the control valve means is shifted to the neutral position thereof said parking brake means is automatically applied.

Since, said manually operated pump means is adapted to be connected with drainage through the brake position of said inching valve means and therefore said parking brake means can be applied while the vehicle is being towed with its engine being not operated by shifting said inching brake valve means to the brake position.

The above and other objects, features and advantages of the present invention will be readily apparent from the following description taken in conjunction with the accompanying drawings.

BRIEF DESCRIPTION OF THE DRAWING

The attached drawing is an overall hydraulic circuit for a hydraulically driven vehicle according to the present invention.

DETAILED DESCRIPTION OF THE INVENTION

The present invention will now be described in detail with reference to the accompanying drawing. Reference numeral 1 denotes a variable displacement hydraulic pump driven by an engine 2. A hydraulic motor 3 is connected with the variable displacement pump 1 in a closed circuit 4 so as to be driven thereby.

Reference numeral 5 represents a fixed displacement charge pump driven by the engine 2. The charge pump 5 functions partly to compensate oil shortage in the closed circuit 4.

A control circuit 6 is provided for controlling a servo valve 1a of the variable displacement pump 1. The servo valve 1a, in turn, controls the displacement of the variable displacement pump 1. The control circuit 6 comprises a fixed displacement pump 7 driven by the engine 2, an adjustable throttling valve 8 coupled with a throttle lever 9 of the engine 2 and operated thereby, an automatic speed control valve 10 operated by the differential pressure between the upstream and the downstream sides of the adjustable throttling valve 8 for controlling the flowing rate therethrough, an inching brake valve 11 and a forward and reverse movements and speed control valve 12 (hereinafter referred to as speed control valve).

The inching brake valve 11 has formed therein a communicating position 11a, a restriction position 11b and a shut off or brake position 11c. By operating a pedal 30 or the like, hydraulic fluid flowing through the inching brake valve 11 is gradually restricted and finally completely shut off in the brake position 11c. The speed control valve 12 has formed therein a neutral position 12a, a forward position 12b and a reverse position 12c and two output conduits therefrom are connected to the servo valve 1a for controlling thereof.

Provided between the two output conduits is an adjustable restriction 13 which is adapted to be restricted in response to the operation of the speed control valve 12.

Reference numeral 14 denotes a parking brake which is mounted on an output shaft 31 of the hydraulic motor 3. The parking brake 14 is mechanically applied by the force of a spring 15 and released by pressurized fluid introduced into a brake chamber 16.

The brake chamber 16 is connected with a pilot operated brake control valve 17 which has formed therein a normal first position 17a and a second position 17b. This brake control valve 17 is adapted to be operated when the engine 2 is stopped.

Connected with the pilot operated hydraulic pump 18. The manually operated hydraulic pump 18 is also connected with the inching brake valve 11 through a conduit 33. When the inching brake valve 11 is shifted to the brake position 11c, the manually operated pump 18 is connected to a tank 40. The pilot operated brake control valve 17 is normally held in the normal first position 17a by a spring 34 and changed to the second position 17b by introducing pressurized fluid from the pump 18 into a pilot port 17c when the pump 18 is manually operated.

The brake control valve 17 is connected through a conduit 35 with a pilot operated second brake control valve 19 which has formed therein a closed first position 19a and a communicating second position 19b. The second brake control valve 19 is normally held in the closed first position by the action of a spring 36. A pilot port 19c of the second brake control valve 19 is connected through a conduit 37 with a shuttle valve 20 disposed between the two output conduits of the speed control valve 12. When pressurized fluid is introduced from the control circuit 6 through the shuttle valve 20 into the pilot port 19c, the second brake control valve 19 is changed to the communicating second position 19b against the spring 36. The second brake control valve 19 is connected through a conduit 38 with the charge pump 5. A relief valve 39 is provided in the conduit 38.

Reference numeral 21 denotes a bypass valve for bypassing the hydraulic motor 3 when the delivery pressure from the charge pump 5 becomes zero.

The operation of the invention will now be described hereinbelow. When the engine 2 is running and the speed control valve 12 remains its neutral position 12a, the control circuit 6 is connected to the tank 40, therefore the displacement volume of the variable displacement pump 1 remains zero. As a result the hydraulically driven vehicle is stopped. Since the hydraulic pressure in the control circuit 6 is drainage pressure, the second brake control valve 19 is set in the closed first position 19a. Therefore no hydraulic fluid from the charge pump 5 is introduced into the brake chamber 16 of the parking brake 14 allowing the parking brake 14 to be applied by the action of the spring 15.

When the speed control valve 12 is shifted to either the forward or the reverse positions while the engine 2 is still running, the vehicle is moved either forwardly or rearwardly. When the inching brake valve 11 is operated while the vehicle is running, the hydraulic pressure in the control circuit 6 is gradually decreased due to the restriction in the inching brake valve 11 and therefore the speed of the vehicle is gradually reduced and finally the vehicle is stopped. At the same time the parking brake 14 is automatically applied since the second brake control valve 19 is changed over to the closed first position 19a and therefore the brake chamber 16 is connected to a tank 41.

In case that the vehicle is towed with its engine being stopped, the parking brake 14 is released by operating the manually operated pump 18. By driving the pump 18 manually, the brake control valve 17 is changed over to its second position 17b because the hydraulic fluid from the pump 18 is introduced into the pilot port 17c and therefore the brake chamber 16 is filled with the hydraulic fluid from the pump 18 thereby releasing the parking brake 14. While the vehicle is being towed and it becomes necessary to reduce the speed of the towed vehicle, it is only necessary to operate the inching brake valve 11. When the inching brake valve 11 is shifted to the brake position 11c, the delivery side of the pump 18 is connected to the tank 40 thereby allowing the brake control valve 17 to be changed over to the first position 17a. Therefore, the parking brake 14 is applied by the action of the spring 15 since the hydraulic fluid in the brake chamber 16 is drained to the tank 41.

Since the present invention is constructed as mentioned hereinabove, the parking brake 14 is automatically applied when the vehicle is stopped by shifting the speed control valve 12 to its neutral position. Therefore there is no chance for an operator to have forgotten to apply the parking brake 14. Besides, since the parking brake 14 can even be applied by operating the inching brake valve 11 while the vehicle is being towed, safety of the towing operation can significantly be improved.

While the invention has been described and shown with particular reference to the preferred embodiment, it will be apparent that many variations might be possible that would fall within the scope of the present invention, which is not intended to be limited except as defined in the following claims.

What we claim is:

1. A hydraulic circuit for a hydraulically driven vehicle, comprising in combination:
   an engine;
   variable displacement pump means driven by said engine having a fluid actuator means:
   hydraulic motor means connected with said variable displacement pump means in a closed circuit and driven thereby, said hydraulic motor means having an output shaft connected thereto;
   first fixed displacement pump means driven by said engine;
   inching brake valve means connected with said first fixed displacement pump means, said inching valve means having at least a communicating position and a brake position and being normally held in the communicating position;

control valve means connected with the output side of said inching brake valve means for controlling the forward and reverse movements of the vehicle and speed thereof, said control valve means having formed therein a neutral position, a forward position and a reverse position and the output side thereof being connected with the fluid actuator means of said variable displacement pump means;

parking brake means coupled with the output shaft of said hydraulic motor means, said parking means having spring means and hydraulic fluid chamber formed therein and being mechanically applied by said spring and released by the pressurized fluid introduced in the hydraulic fluid chamber;

pilot operated first brake control valve means connected with the hydraulic fluid chamber of said parking brake means, said first brake control valve means having a normal first position and a second position;

manually operated pump means connected with said first brake control valve means, the pilot operator thereof and with said inching brake valve means, said manually operated pump means introducing pressurized fluid into the hydraulic fluid chamber of said parking brake means through the second position of the first brake valve control means to release the parking brake means;

pilot operated second brake control valve means connected in series with said first brake control valve means to said parking brake means, a pilot port thereof being connected with the output side of said control valve means, said second brake control valve means having a closed first position and a communicating second position; and second fixed displacement pump means driven by said engine and connected with said second brake control valve means whereby, while the engine is running and said control valve means is either in its forward position or reverse position, said parking brake means is automatically released by introducing pressurized fluid from said second fixed displacement pump means into the hydraulic fluid chamber of said parking brake means through the communicating second position of said second brake control valve means and the normal first position of said first brake control valve means and when said control valve means is shifted to the neutral position thereof said parking brake means is automatically applied.

2. A hydraulic circuit for a hydraulically driven vehicle as recited in claim 1 wherein said manually operated pump means is adapted to be connected with drain through the brake position of said inching valve means and therefore said parking brake means may be applied while the vehicle is being towed with its engine being not in operation by shifting said inching brake valve means to the brake position.

3. A hydraulic circuit for a hydraulically driven vehicle as recited in claim 1 wherein a shuttle valve is disposed in the output side of said control valve means and the pilot port of said second brake control valve means is connected with said shuttle valve.

4. A hydraulic circuit for a hydraulically driven vehicle as recited in claim 1 further comprising bypass valve means disposed in said closed circuit in parallel with said hydraulic motor means.

* * * * *